Jan. 15, 1935.   C. E. SWENSON   1,987,807
UNIVERSAL JOINT ASSEMBLY
Filed Aug. 14, 1929   2 Sheets-Sheet 1

Inventor
Carl E. Swenson
By Wilson & McCanna
Attys.

Jan. 15, 1935.  C. E. SWENSON  1,987,807
UNIVERSAL JOINT ASSEMBLY
Filed Aug. 14, 1929  2 Sheets-Sheet 2
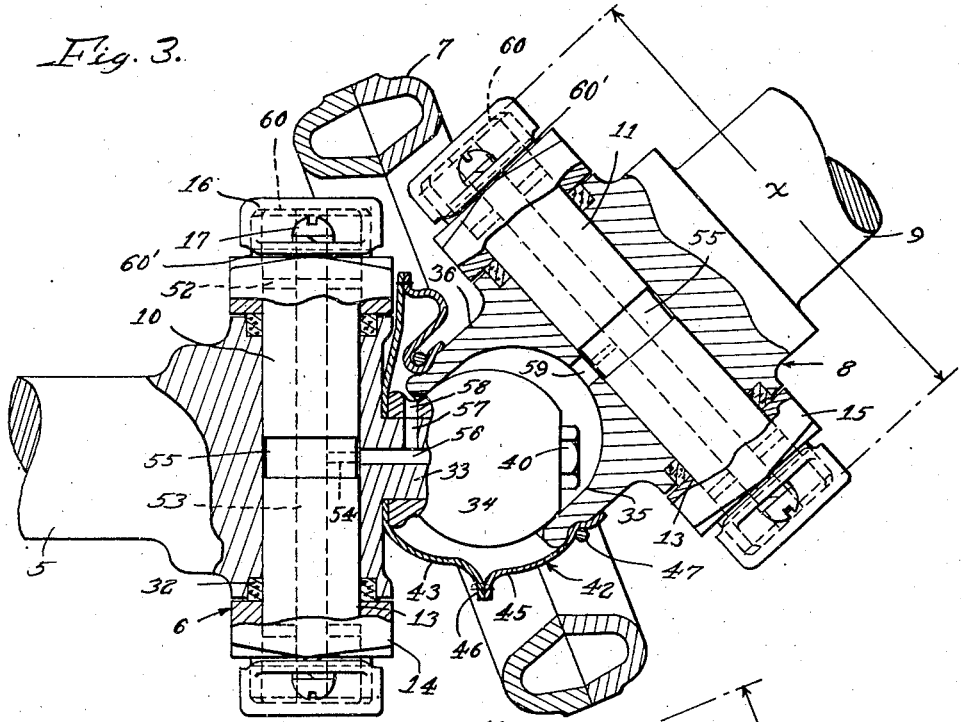
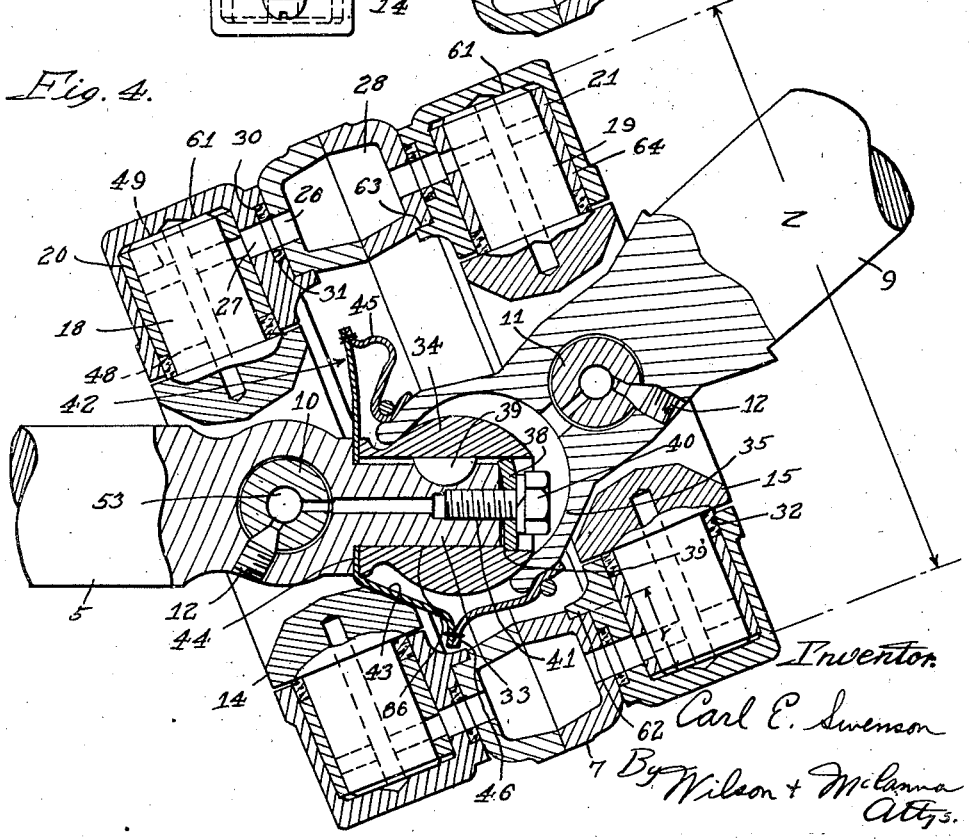
Inventor.
Carl E. Swenson
By Wilson & McCanna
Attys.

Patented Jan. 15, 1935

1,987,807

UNITED STATES PATENT OFFICE 1,987,807

UNIVERSAL JOINT ASSEMBLY

Carl E. Swenson, Rockford, Ill., assignor to Mechanics Universal Joint Company, Rockford, Ill., a corporation of Illinois Application August 14, 1929, Serial No. 385,844

31 Claims. (Cl. 64—102)

This invention relates to universal joint assemblies, such as are required in front wheel drives for automobiles, where two universal joints are built into one assembly.

In a universal joint assembly of this kind a ball and socket joint is required to connect the driving yoke member of the one universal with the driven yoke member of the other universal to keep them in centered relation with one another, and it is also important that this centering joint be kept well lubricated and sealed against the entry of grit and dirt. Now, owing to the amount of relative movement of the parts, the enclosing of the joint presents quite a problem. Boots of leather or rubberized material made in the form of an ordinary sleeve with a longitudinal seam have been provided for the enclosing of these joints, but, owing to the fact that they were apt to fold inwardly in the relative movement of the parts, they usually did not give much service before being bruised or ruptured by getting pinched between the yoke members. It is, therefore, one important object of my invention to provide a boot made in two parts, joined by a circular peripheral outside seam that will not allow the walls of the boot to fold in such a way as to get pinched. Thus, the boot lasts indefinitely and keeps the joint well packed with lubricant and sealed so as to give good service.

Another problem in the design of these universal joint assemblies has been that of keeping the trunnions and cross-pins from having too much end play. I have so constructed the joint that a predetermined clearance is always insured for the ends of the trunnions and cross-pins with reference to end thrust bearings to avoid noisy operation and still insure proper lubrication.

Still another problem has been that of making certain that all bearings are supplied with the proper amount of lubricant without the objection of its being thrown off under centrifugal action. It is, therefore, still another important object of my invention to so interconnect the bearings by ducts and grooves with the intermediate transmission rings, that the entire assembly can be filled under pressure by means of a fitting on the ring, the lubricant being introduced until the boot enclosing the centering joint, which is in communication with the aforesaid ducts and grooves, is entirely filled, as evidenced by some of the lubricant oozing from the seams thereof. The arrangement of the ducts and grooves is such that lubricant is supplied under centrifugal action from the boot as well as from the chamber in the intermediate transmission ring to the journals and it is found that when a non-fluid oil is used, there is practically none thrown off under centrifugal action, and the assembly remains filled indefinitely.

The invention is fully described in the following specification by reference to the accompanying drawings, in which—

Fig. 3 is a central, longitudinal section taken on the line 3—3 of Fig. 2, but showing the parts in altered relationship, and Fig. 4 is another longitudinal section in a plane at right angles to Fig. 3, that is, on the line 4—4 of Fig. 2, again showing the parts in altered relationship.

The same reference numerals are applied to corresponding parts throughout the views.

Figure 1:
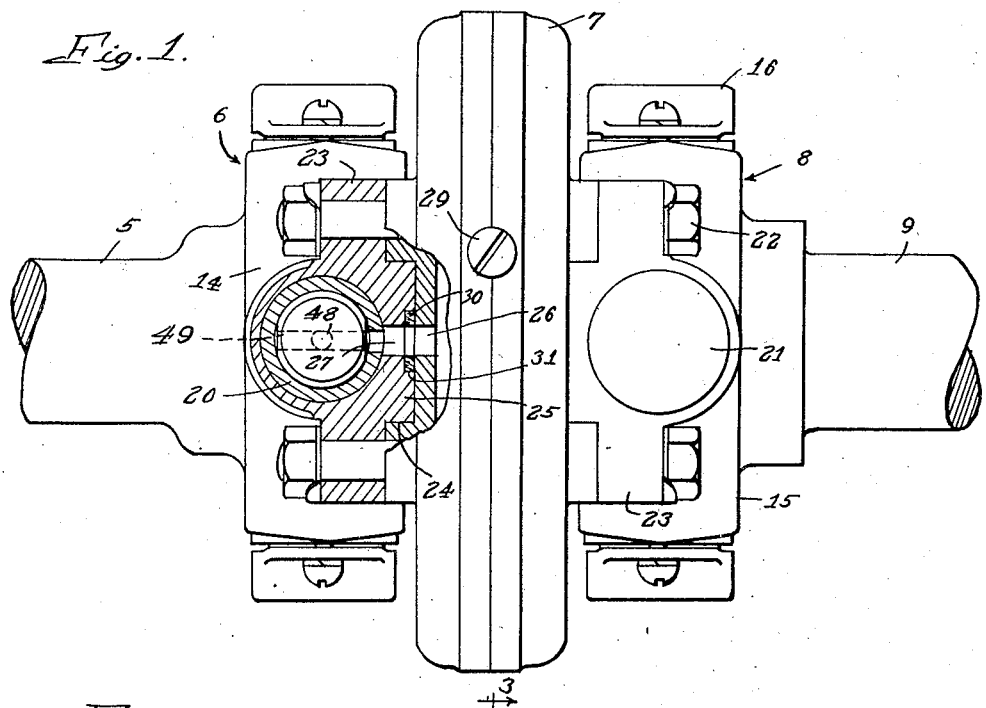
Figure 1 is a side view of a universal joint assembly embodying my invention, a part of the joint being shown in section better to illustrate the construction.
Figure 2:
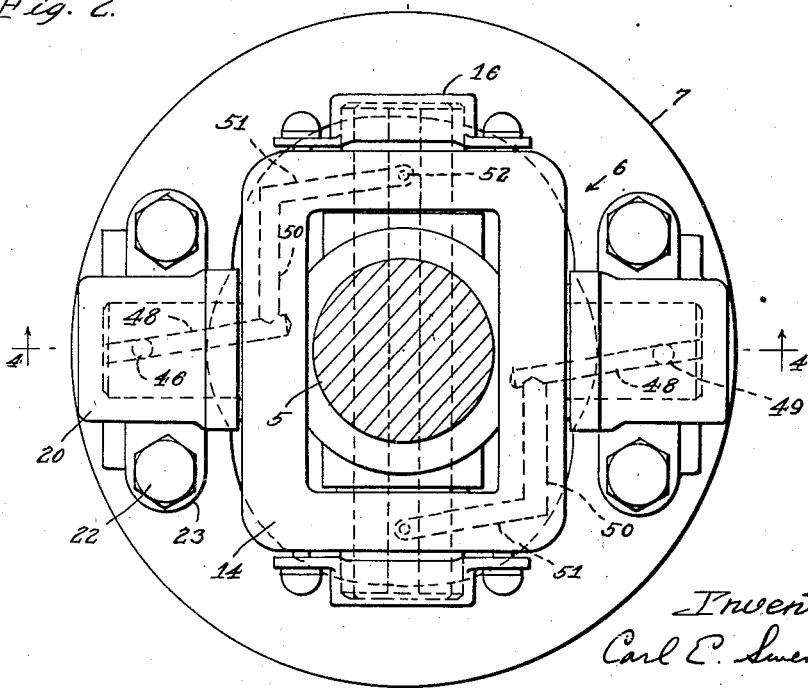
Fig. 2 is a view looking at the left-hand end of Fig. 1.

In a universal joint assembly of the kind herein contemplated, the part designated by the reference numeral 5 represents the driving yoke member of one of the two universal joints designated generally by the reference numeral 6. The latter is connected by means of an intermediate transmission ring 7 with another universal joint designated generally by the reference numeral 8, the part numbered 9 being the driven yoke member of the latter joint. An assembly of this kind, generally speaking, is well known. The yokes 5 and 9 have cross-pins 10 and 11 mounted therein and suitably secured against endwise movement by means of set screws 12, Fig. 4. The ends of these cross-pins serve as trunnions received in bearings 13 in transmission rings 14 and 15 related to the yokes 5 and 9 respectively. The rings 14 and 15 are small enough to permit of their swinging into such positions as shown in Fig. 3 inside the ring 7. Caps 16 covering the ends of the bearings 13 are suitably secured in place by means of screws 17. Further reference will be made to the caps 16 to show how these parts provide end thrust bearings for the cross-pins 10 and 11. Trunnions 18 and 19 are formed integral with the rings 14 and 15, respectively, in right angular relation to the trunnions provided by the ends of the cross-pins 10 and 11. These trunnions 18 and 19 are suitably received in bearings 20 and 21, respectively, fastened to the opposite sides of the ring 7 by means of through bolts 22 passed through ears 23 suitably formed integral with said bearings. The ring 7 is usually made in two halves, each of which is annular in form with a channel-shaped cross-section, as is best evident in Figs. 3 and 4. Each of these halves is milled transversely on the outer face thereof to provide slots 24 snugly to receive bosses 25 formed on the abutting face of the bearings 20 and 21, whereby definitely to locate the bearings with reference to the ring 7 and facilitate the assembling of the bearings on the ring and the fastening thereto by means of the bolts. The slots and bosses which interfit as just stated form interlocking connections between the ring 7 and the bearings 20 and 21 through which the driving torque is transmitted between the transmission ring and the universal joints, thus relieving the bolts 22 of the shearing action that would otherwise be present and insuring freedom from objectionable play in the assembly. The bosses have a snug fit in the slots so that there is a solid metal-to-metal contact between the faces. It will presently appear also how the bearings 20 and 21 are definitely located with reference to the ring 7 to provide end thrust bearings for the trunnions 18 and 19. Oil holes 26 are provided in the side walls of the ring 7 in registering relation with oil holes 27 provided in the bearings and serve to establish communication between the bearings and the annular oil reservoir 28 provided inside the ring 7. A removable plug 29 affords communication to the reservoir 28. Gaskets 30 of cork or other suitable compressible material are placed in counterbores 31 provided for the purpose in the outer ends of the oil holes 27, and are arranged to be compressed between the bearings and the ring 7 in the fastening of the bearings thereto, thus making an absolutely oil-tight connection. Gaskets 32 provided in connection with all of the trunnions serve a similar purpose.

The centering joint for keeping the yokes 5 and 9 in centered relation to one another comprises, briefly, an axial stem 33 projecting from the one yoke member, in this case the yoke 5, and having a ball 34 mounted rigidly thereon and received in a socket 35 provided in a cylindrical boss 36 formed preferably integral with the yoke member 9. The stem 33 fits snugly in the central bore 86 of the ball 34 and has a key 39 thereon fitting in a keyway provided in said bore, whereby to hold the ball against turning with reference to the stem. A washer 38 bearing on an annular seat 39 provided in the outer end 39' of the bore 86 has a lug received in the aforesaid keyway for holding the same against turning with reference to the ball, and a bolt 40 passes through a center hole in the washer 38 and threads into an axial hole 41 provided in the end of the stem 33. Thus, when the bolt 40 is tightened the ball 34 is drawn home on the stem, and a lock washer, preferably inserted under the head of the bolt, keeps the latter from working loose once it is tightened. Obviously, in the relative movement of the yoke members 5 and 9 with reference to one another, the ball 34 is arranged to reciprocate as well as oscillate in the socket 35, and this centering joint must necessarily be kept well lubricated and free from dirt. As stated before, it was customary to have a boot in the form of a sleeve extending from the yoke member 5 to the yoke member 9 over the centering joint and enclosing the same. However, due to the fact that the yoke members 5 and 9 come into such relationships as are disclosed in Figs. 3 and 4, these boots, which were ordinarily made in one piece with a longitudinal seam joining the ends, were apt to fold inwardly and get between the parts and be pinched. It was only a question of time, therefore, when the boot would be bruised or punctured, and it became necessary to replace the same. In order to avoid that objection, I have provided a boot 42 made in two parts, both preferably of rawhide, namely, a disk 43 having a center hole therein for the projection therethrough of the stem 33 and arranged to be clamped onto an annular shoulder 44 by means of the ball 34 when the bolt 40 is tightened, and a sleeve 45 having one end thereof joined to the outer edge of the disk 43, as represented at 46, with a circular peripheral outside seam. The sleeve 45, which may be formed from a single piece of material having the ends thereof overlapping and joined with a longitudinal seam (not shown), has to be more or less tapered because of the difference in diameter between the disk 43, to which the large end is sewed, and the boss 36, over which the small end fits and is suitably secured as by means of a wire 47 wound tightly around the outside of the boot. The boss 36 is preferably annularly grooved at the outer end thereof so that the boot will not slip off when the wire 47 is wound about the same. It is evident from observation of Figs. 3 and 4 that, regardless of the extreme positions to which the yokes 5 and 9 may be moved with reference to one another, there is no danger or any part of the boot folding inwardly and getting in between the parts and being pinched and damaged. The seam 46 predetermines the folding of the walls of the boot and keeps every part of the boot clear of any interference with the relatively moving parts of the universal joint assembly. I shall now describe how the boot 42 as well as every other part of the assembly is arranged to be filled with a non-fluid oil for the lubrication of the centering joint, as well as all of the other bearings.

The intermediate transmission ring 7, as stated before, has a removable plug 29 affording communication to the reservoir 28 provided in said ring. This plug is arranged to be removed and a pressure lubricator nipple substituted therefor to permit the introduction of the lubricant under pressure so that it will be sure to reach all parts of the assembly. It is obvious that the lubricant will get to the bearings 20 and 21 through the registering holes 26 and 27. The trunnions 18 and 19 are drilled longitudinally at 48 to provide a duct communicating with other ducts 49 drilled crosswise. The ducts 48 communicate with ducts 50 and 51 drilled in the ring members 14 and 15 to establish communication with the bearings 13 for the cross-pins 10 and 11. The latter are drilled crosswise of the ends thereof, as represented at 52, Fig. 3, for communication with the ducts 51, and are also drilled longitudinally, as represented at 53, to establish communication between the ducts 52 at opposite ends of each pin. The ducts 51 open into the bearings 13 through holes large enough to be sure of communication with the ducts 52 even though the cross-pins may not be very accurately positioned when they are secured by means of their set screws 12. The pins are also drilled radially intermediate the ends, as shown at 54, to establish communication between the longitudinal ducts 53, Fig. 3, and annular grooves 55 provided in the outside of said pins intermediate the ends of the latter. The annular grooves 55 insure communication between the ducts 54 and other ducts intended to communicate therewith, regardless of whether the pins 10 and 11 are accurately positioned, as will soon appear. Now, with reference to the yoke 5, an axial hole 56 is drilled in the stem 33 to communicate with the annular groove 55. The outer end of this hole or duct is sealed by the bolt 40, but a radial hole 57, Fig. 3, communicates therewith and registers with a hole 58 drilled through the neck on the base of the ball 34, whereby to establish communication between the duct 56 and the inside of the boot 42. As regards the yoke 9, a hole 59 is drilled in the bottom of the socket 35 for communication with the annular groove 55 of the cross-pin 11, whereby to establish communication between the annular groove 55 and the socket 35. It should now be apparent that when the non-fluid oil used as the lubricant is introduced into the reservoir 28 in the ring 7 under pressure, the reservoir is first filled and then the lubricant works its way out through the holes 26 and 27 and through ducts 49 and 48, 50 and 51 to the ducts 52 and 53, from whence it finds its way out through ducts 54 into the annular grooves 55. In the case of the yoke member 5, the lubricant passes from the groove 55 through ducts 56, 57 and 58 into the boot 42, and in the case of the yoke member 9, the lubricant finds its way from the annular groove 55 through the hole 59 into the socket 35 and oozes out past the ball 34 into the boot 42. At first all of the air displaced by the lubricant seeps through the seams of the boot, and later, when all of the air is displaced and the boot is filled with lubricant, the operator can tell when the assembly is filled by noticing when lubricant commences to ooze through seams of the boot. It is found that with this system of lubrication an adequate supply of lubricant is provided to the journal bearings 13 for the cross-pins 10 and 11, and the journal bearings 20 and 21 for the trunnions 18 and 19, respectively, as well as for the end thrust bearings 60 for the cross-pins and the end thrust bearings 61 for the trunnions; the lubricant is bound to reach these parts through the ducts under centrifugal action both from the boot 42 through the ducts communicating therewith and from the reservoir 28 through the ducts communicating therewith. The non-fluid oil does not tend to seep from the bearings very readily and, as a result, the assembly will operate practically indefinitely with one charge of lubricant.

With reference to the end thrust bearings 60 provided for the cross-pins 10 and 11, I provide these bearings in the caps 16 with an accurately predetermined clearance between said bearings and the ends of the pins in the following manner: each forged ring member, 14 or 15, is first provided with the accurately ground trunnions 18 or 19 and then, using these trunnions to locate the member in a fixture, the ends of the bearings 13 are accurately ground off to a predetermined dimension, represented by the letter X in Fig. 3. Assume that this dimension is 3.500 to 3.501″, and that it is desired to provide a clearance of one thousandth of an inch at each of the end thrust bearings; then, the cross-pins will be accurately ground off at the ends to a dimension of 3.498 to 3.499″. Then, when the caps 16 are slipped over the ends of the bearings 13, it obviously makes no difference how tightly the screws 17 are drawn up; the clearance provided for will be definitely established and cannot be interfered with. Cork washers 60′ are preferably inserted under the caps 16 and compressed in the tightening of the screws 17 to seal the journal bearings 13 against any likelihood of oil escaping With regard to the end thrust bearings 61, I shall now describe how I insure a predetermined clearance between the ends of the trunnions 18 or 19 and these end thrust bearings. The bearings 20 and 21 are suitably forged and have the bearing surfaces 61 ground accurately in the inner ends thereof to a predetermined dimension Y indicated in Fig. 4 with reference to a shoulder 62 milled on the side of the bearing. The shoulders 62 bear on shoulders 63 milled on the side of the ring 7 in a predetermined relation to one another. Hence, since the dimension Y is accurately predetermined and the dimension between shoulders 63 is also accurately predetermined, and the fact that the trunnions 18 or 19 have the ends thereof ground off to a predetermined dimension Z, also represented in Fig. 4, it must be clear that when the bearings 20 and 21 are slipped over the trunnions with the shoulders 62 thereof engaging the shoulders 63 on the ring 7, and the bearings are bolted in place, the ends of the trunnions 18 and 19 will have a predetermined clearance with reference to the end thrust bearings 61. Obviously, a clearance of one thousandth of an inch or so can be accurately provided for. Hardened and accurately ground bushings 64, pressed in the bearings 20 and 21, provide good journal bearings for the trunnions.

It is believed the foregoing description conveys a clear understanding of my invention. The following claims have been drawn with a view to affording sufficient protection to cover all legitimate modifications and adaptations.

I claim:

1. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the combination with the centering joint and the driving and driven yoke members of a boot of flexible material extending from the one yoke member to the other about said joint to retain lubricant and exclude dirt, said boot being made in two sections, the one section being attached to the one yoke member and the other section to the other yoke member and extending from said yoke members toward one another and secured together by the edges thereof by an outside seam whereby to prevent the folding inwardly of the walls of the boot in the movement of the yoke members relative to one another.

2. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the combination with the centering joint and the driving and driven yoke members of a boot of flexible material extending from the one yoke member to the other about said joint to retain lubricant and exclude dirt, said boot being in two sections, the one section being in the form of a substantially flat disc of flexible material having a portion of the one yoke member extending through a center hole therein and attached thereto, and the other section being in the form of a sleeve made of flexible material having one end thereof attached to the other yoke member and having its other end secured by its edge to the marginal edge portion of the first section by an outside peripheral seam whereby to prevent the folding inwardly of the walls of the boot in the movement of the yoke members relative to one another.

3. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the combination with the centering joint and the driving and driven yoke members of a boot of flexible material extending from the one yoke member to the other about said joint to retain lubricant and exclude dirt, said boot being made in two sections, the one section being in the form of a flat substantially circular disc of flexible material having a portion of the one yoke member extending through a center hole therein and attached thereto, and the other section being made of a single piece of flexible material in a sleeve form suitably seamed longitudinally, said sleeve having one end thereof attached to the other yoke member and having its other end secured by its edge to the marginal edge portion of the first section by an outside peripheral seam whereby to prevent the folding inwardly of the walls of the boot in the movement of the yoke members relative to one another.

4. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the said centering joint comprising an axially located socket provided in the end of one yoke member, and a ball fitting in said socket and over a reduced axial stem portion provided on the other yoke member and secured to the latter, the combination with said centering joint of a boot enclosing the same and extending from the one yoke member to the other, said boot being made in two sections, the one section being in the form of a substantially flat circular disc of flexible material having a center hole for the passage therethrough of the aforesaid stem whereby said section is attached to the yoke member in the fastening of the ball on said stem, and the other section being in the form of a sleeve of flexible material having the one end thereof secured to the other yoke member and having the other end thereof secured by its edge to the marginal edge portion of the first mentioned section by an outside seam whereby to prevent the folding inwardly of the walls of the boot in the movement of the yoke members relative to one another.

5. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the said centering joint comprising an axially located socket provided in the end of the one yoke member, and a ball fitting in said socket and over a reduced axial stem portion provided on the other yoke member and secured to the latter, the combination with said centering joint of a boot of flexible material enclosing the same and extending from the one yoke member to the other, said boot having an opening in the one end thereof for the passage therethrough of the aforesaid stem whereby the same is arranged to be clamped to the one yoke member in the fastening of the ball on said stem, and the other end of said boot fitting over the outside of said socket on the other yoke member and secured thereto.

6. A structure as set forth in claim 5 wherein the ball is slidably but non-rotatably received on the stem whereby the same is arranged to clamp the one end of the boot in the fastening thereof on said stem, said ball having the stem reaching only part way through the bore thereof and having an enlargement in the bore beyond the end of said stem providing an annular shoulder, a washer engaging said shoulder, and a bolt passing through the washer and threading into the end of said stem and arranged when tightened to force the ball inwardly on the stem to clamp the end of the boot.

7. In a universal joint assembly, a pair of universal joints, an intermediate transmission member providing a driving connection between said joints, a centering joint between the universal joints for centering the driving yoke member of one joint with the driven yoke member of the other joint, said centering joint comprising a socket axially located in the end of one yoke member and a ball axially located on the end of the other yoke member and fitting in said socket, and a boot of flexible material enclosing said joint and extending from the one yoke member to the other, said transmission member being hollow and constituting a lubricant reservoir arranged to have lubricant supplied thereto preferably under pressure and the one universal joint having ducts provided therein interconnecting the bearings thereof with said reservoir and establishing communication between the reservoir and the boot, and the other universal joint likewise having ducts provided therein interconnecting the bearings thereof with said reservoir and establishing communication between the reservoir and the boot, whereby lubricant is supplied to all of the bearings of the universal joint assembly and likewise to the centering joint thereof.

8. In a universal joint assembly, a pair of universal joints, an intermediate transmission member providing a driving connection between said joints, and a centering joint between the universal joints for centering the driving yoke member of one joint with the driven yoke member of the other joint, said transmission member being hollow and constituting a lubricant reservoir arranged to have lubricant supplied thereto preferably under pressure, the both universal joints having ducts provided therein interconnecting the bearings thereof with the lubricant reservoir and at least one of said universal joints having the ducts thereof establishing communication between the reservoir and the centering joint.

9. In a universal joint assembly, a pair of universal joints, an intermediate transmission member providing a driving connection between said joints, a centering joint between the universal joints for centering the driving yoke member of one joint with the driven yoke member of the other joint, said centering joint comprising a socket axially located in the end of one yoke member and a ball axially located on the end of the other yoke member and fitting in said socket, and a boot of flexible material enclosing said joint and extending from the one yoke member to the other, said transmission member being hollow and constituting a lubricant reservoir arranged to have lubricant supplied thereto preferably under pressure, the one universal joint having ducts provided therein interconnecting the bearings thereof with the lubricant reservoir and establishing communication between said reservoir and the socket of the centering joint whereby to supply lubricant to the latter until excess lubricant seeps therefrom into the boot, and the other universal joint likewise having ducts provided therein interconnecting the bearings thereof with the reservoir and establishing communication between the reservoir and the boot through the ball of the centering joint.

10. In a universal joint assembly, a pair of universal joints each comprising a yoke member and a transmission ring pivotally connected with the yoke member by means of a cross-pin extending through the yoke member and received in bearings in the ring, and each ring having a pair of opposed trunnions at right angles to the axis of its cross-pin, an intermediate transmission ring between the two universal joints having bearings on opposite sides thereof receiving the trunnions of said transmission rings, and a centering joint for keeping the yoke members in centered relation to one another in all positions thereof, said centering joint comprising a socket axially located on the one yoke member, and a ball axially disposed on the other yoke member and received in said socket, said intermediate transmission ring being hollow and constituting a lubricant reservoir, passages provided between said reservoir and the trunnion bearings for supplying lubricant to the latter, other passages provided in the transmission rings between the trunnion bearings and the cross-pin bearings whereby to supply lubricant to the latter, still other passages provided between the cross-pin bearings and the ball and socket of the centering joint whereby to supply lubricant to the latter, and a boot enclosing the centering joint and extending from the one yoke member to the other yoke member.

11. In a universal joint assembly, a pair of universal joints each comprising a yoke member and a transmission ring pivotally connected with the yoke member by means of a cross-pin extending through the yoke member and received in bearings in the ring, and each ring having a pair of opposed trunnions at right angles to the axis of its cross-pin, an intermediate transmission ring between the two universal joints having bearings on opposite sides thereof receiving the trunnions of said transmission rings, and a centering joint for keeping the yoke members in centered relation to one another in all positions thereof, said centering joint comprising a socket axially located on the one yoke member, and a ball axially disposed on the other yoke member and received in said socket, said intermediate transmission ring being hollow and constituting a lubricant reservoir, passages provided between said reservoir and the trunnion bearings for supplying lubricant to the latter, other passages provided in the transmission rings between the trunnion bearings and the cross-pin bearings whereby to supply lubricant to the latter, the cross-pins having longitudinal passages provided therein interconnecting the bearings at opposite ends thereof, and at least one of said pins having a transverse passage provided therein intermediate the ends thereof for establishing communication with the ball and socket joint.

12. In a universal joint assembly, a pair of universal joints each comprising a yoke member and a transmission ring pivotally connected with the yoke member by means of a cross-pin extending through the yoke member and received in bearings in the ring, and each ring having a pair of opposed trunions at right angles to the axis of its cross-pin, an intermediate transmission ring between the two universal joints having bearings on opposite sides thereof receiving the trunnions of said transmission rings, and a centering joint for keeping the yoke members in centered relation to one another in all positions thereof, said centering joint comprising a socket axially located on the one yoke member, a ball mounted on an axial stem extending from the other yoke member, said ball being received for reciprocation and oscillation in said socket, and a boot enclosing said joint extending from the one yoke member to the other, the intermediate transmission ring being hollow and constituting a lubricant reservoir, passages provided between said reservoir and the trunnion bearings for supplying lubricant to the latter, other passages provided in the transmission rings between the trunnion bearings and the cross-pin bearings for supplying lubricant to the latter, a passage provided in the one yoke member communicating with the socket of the centering joint, another passage provided in the other yoke member extending through the axial stem and the ball thereon, and passages provided between the cross-pin bearings on the two yoke members and the last mentioned passages whereby lubricant is supplied to the centering joint.

13. A structure as set forth in claim 12 wherein the cross-pins provide the last mentioned passages, said cross-pins being drilled from end to end to provide longitudinal passages establishing communication between the bearings at opposite ends thereof and being drilled transversely intermediate the ends and provided with external annular grooves communicating through said transverse holes with the longitudinal passages, the passage in the one yoke member communicating with the socket being in communication with the annular groove of its cross-pin and in communication through the transverse hole with the longitudinal passage in any position of the pin, and the passage in the axial stem of the other yoke member being in communication with the annular groove of its cross-pin and in communication through the transverse hole with the longitudinal passage in said pin in any position thereof.

14. In a universal joint assembly, a pair of universal joints each comprising a yoke member and a transmission ring pivotally connected with the yoke member by means of a cross-pin extending through the yoke member and received in bearings in the ring, and each ring having a pair of opposed trunnions at right angles to the axis of its cross-pin, an intermediate transmission ring between the two universal joints having bearings on opposite sides thereof receiving the trunnions of said transmission rings, and a centering joint for keeping the yoke members in centered relation to one another in all positions thereof, each pair of related cross-pin bearings being in the form of a pair of oppositely directed substantially cylindrical bosses projecting from opposite sides of the transmission ring, the outer ends of said bosses being finished to give a predetermined dimension between said ends, and the cross-pin received in said bearings having its ends finished to a predetermined dimension with relation to said other dimension, and there being caps fitting over said bosses to close the cross-pin bearings and secured to the transmission ring, said caps providing end walls seating on the finished end faces of the bosses and brought thereby into predetermined relation to the ends of the cross-pin to serve as end thrust bearings therefor.

15. A structure as set forth in claim 14 wherein the caps for the cross-pin bearings are flanged to receive bolts passing therethrough into the transmission ring arranged to draw the caps down tight on the ends of said bosses, the structure including compressible washers fitting about the base of the bosses under said caps and arranged in the tightening of the bolts to be compressed by the caps whereby to seal the cross-pin bearings against loss of lubricant, the said washers being small enough in size and sufficiently compressible so as not to interfere with the seating of the end walls provided by said caps on the end faces of said bosses for the purpose described.

16. In a universal joint assembly, a pair of universal joints each comprising a yoke member and a transmission ring pivotally connected with the yoke member by means of a cross-pin extending through the yoke member and received in bearings in the ring, and each ring having a pair of opposed trunnions at right angles to the axis of its cross-pin, an intermediate transmission ring between the two universal joints having bearings on opposite sides thereof receiving the trunnions of said transmission rings, and a centering joint for keeping the yoke members in centered relation to one another in all positions thereof, the trunnion bearings being in the form of separate blocks arranged to be secured to the sides of the intermediate transmission ring, said blocks having the journal bearings provided therein and having end thrust bearing faces provided on the inside of the end walls thereof, said blocks having shoulders formed on the outside thereof finished to a predetermined dimension with respect to said end faces, the intermediate transmission ring having two pairs of opposed shoulders provided thereon for engagement by the shoulders on the two pairs of trunnion bearing blocks, each pair of said shoulders being finished to a predetermined dimension with reference to one another, and the opposed trunnions on each transmission ring having the end faces thereof finished to another predetermined dimension with relation to the last mentioned dimension whereby when the bearing blocks are fitted on the trunnions and fastened to the intermediate transmission ring with the shoulders thereon engaging the shoulders of said ring the ends of said trunnions are in a predetermined relation to the end thrust bearing surfaces of said bearing blocks for the purpose described.

17. A structure as set forth in claim 16 including compressible washers fitting about the trunnions and arranged to be compressed by the engagement therewith of the inner ends of the bearing blocks when said blocks are secured to the intermediate transmission ring whereby to seal the trunnions bearing against loss of lubricant, the said washers being sufficiently small in size and sufficiently compressible so as not to interfere with the bringing of the end thrust bearing faces of said blocks into proper relation to the ends of said trunnions for the purpose described.

18. In a universal joint assembly, a pair of trunnion type universal joints, an intermediate transmission ring having a diametrical groove in each side, bosses on a pair of trunnion bearings of each universal joint fitting in the grooves in the adjoining side of the transmission ring, each interfitting groove and boss providing a torque-transmitting connection whereby to relieve the bearing fastenings of the load incident to transmission of torque through the ring from the one joint to the other, and means clamping said trunnion bearings to the transmission ring.

19. In a universal joint assembly, a pair of trunnion type universal joints, an intermediate transmission ring having a pair of trunnion bearings of each of said joints fastened to opposite sides thereof, and torque-transmitting connections between the transmission ring and said bearings comprising interfitting bosses and grooves, whereby to relieve the bearing fastenings of the load incident to transmission of torque through the ring from one joint to the other.

20. In a universal joint assembly, a pair of trunnion type universal joints, an intermediate transmission ring having a diametrical groove in each side, bosses on a pair of trunnion bearings of each universal joint fitting in the grooves in the adjoining side of the transmission ring, each interfitting groove and boss providing a torque-transmitting connection, the transmission ring being hollow and constituting a lubricant reservoir, ducts extending through said bosses and providing communication between said reservoir and the trunnion bearings for passage of lubricant from said reservoir to said bearings, and means for securing said trunnion bearings to the transmission ring.

21. In a universal joint assembly, a pair of trunnion type universal joints, bearings for the trunnions thereof, an intermediate transmission ring having end thrust shoulders provided on each side thereof, bosses on a pair of trunnion bearings of each universal joint providing shoulders for abutment with the end thrust shoulders on the ring, the interengaging shoulders providing end thrust transmitting connections, the transmission ring being hollow and constituting a lubricant reservoir, openings being provided in the side walls of the ring for registration with openings provided in the aforesaid bosses whereby to place the bearings in communication with the reservoir for the passage of lubricant therebetween, the interengaging end thrust transmitting shoulders serving to maintain said openings in a predetermined relation to one another, and means for securing the trunnion bearings to the transmission ring.

22. In a universal joint assembly, a pair of trunnion type universal joints, an intermediate transmission ring having a diametrical groove in each side, bosses on a pair of trunnion bearings of each universal joint fitting in the grooves in the adjoining side of the transmission ring, each interfitting groove and boss providing a torque-transmitting connection, the transmission ring being hollow and constituting a lubricant reservoir, ducts extending through said bosses and providing communication between said reservoir and the trunnion bearings for passage of lubricant from said reservoir to said bearings, said ring having end thrust shoulders provided thereon and said bearings having shoulders for engagement with the end thrust shoulders to provide end thrust transmitting connections between the bearings and the ring, and means for securing said trunnion bearings to the transmission ring.

23. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the combination with the centering joint and the driving and driven yoke members of a boot of flexible material extending from the one yoke member to the other about said joint to retain lubricant and exclude dirt, said boot being made in two sections, the one section being disk shaped and attached at its center to the one yoke member and the other section being in the form of a tapered sleeve, secured at its large end to the edge of the disk and having its small end fitting over a portion of the other yoke member and attached thereto.

24. In a universal joint assembly comprising a pair of universal joints, an intermediate transmission member providing a driving connection between said joints, and a centering joint between the universal joints for centering the driving yoke member of the one joint with the driven yoke member of the other joint in all positions which the one member may assume with respect to the other in operation, the combination with the centering joint and the driving and driven yoke members of a boot of flexible material extending from the one yoke member to the other about said joint to retain lubricant and exclude dirt, said boot being made in two sections, the one section being disk shaped with a hole provided in the center thereof whereby to permit the fastening thereof on a portion of the one yoke member adapted to be received in the center hole, and the other section being in the form of a tapered sleeve attached at its large end to the edge of the disk and arranged to have the small end fit over a portion of the other yoke member and attached thereto.

25. In a universal joint assembly, the combination of a pair of trunnion type universal joints, an intermediate transmission member providing a mounting on opposite sides thereof for one pair of trunnions of each of the universal joints whereby to place the joints in drive transmitting relation to one another, a centering joint between the universal joints for centering the driving yoke member of the one joint with the driven yoke member of the other joint in all positions which the one member may assume with respect to the other in operation, and a boot of flexible material extending from the one yoke member to the other about said joint to retain lubricant and exclude dirt, the intermediate transmission member being hollow to serve as a lubricant reservoir arranged to have lubricant supplied thereto preferably under pressure, there being passages provided in said assembly establishing communication between the intermediate transmission member and the trunnions of each of the universal joints, and other passages establishing communication between the trunnions of each of the universal joints and the centering joint, and said boot being constructed to serve as an air vent for the escape of air from the system of passages, whereby to permit complete filling of the assembly with lubricant.

26. A universal joint assembly comprising a pair of universal joints, an intermediate transmission member providing a driving connection between said joints, a centering joint between the universal joints for centering the driving yoke member of the one joint with the driven yoke member of the other joint in all positions which the one member may assume with respect to the other in operation, and a boot of flexible material extending from the one yoke member to the other about the centering joint to retain lubricant and exclude dirt, the intermediate transmission member being hollow and constituting a lubricant reservoir arranged to have lubricant supplied thereto, preferably under pressure, passages in said assembly providing communication between said intermediate transmission member and each of said joints and between each of said joints and the centering joint, the said boot being constructed to serve as an air vent for the escape of air from the system of passages, whereby to permit complete filling of the assembly with lubricant.

27. In a universal joint assembly, a pair of universal joints, an intermediate transmission member providing a driving connection between said joints, and a centering joint between the universal joints for centering the driving yoke member of one joint with the driven yoke member of the other joint, said transmission member being hollow and constituting a lubricant reservoir arranged to have lubricant supplied thereto preferably under pressure, the both universal joints having ducts provided therein interconnecting the bearings thereof with the lubricant reservoir and at least one of said universal joints having the ducts thereof establishing communication between the reservoir and the centering joint, and a boot of flexible material enclosing said joint and extending from the one yoke member to the other, said boot being adapted to have excess lubricant seep from the joint into the boot and being so constructed to serve as an air vent to permit complete filling of the assembly with lubricant from the reservoir.

28. In a universal joint assembly, a pair of universal joints each comprising a yoke member and a transmission ring pivotally connected with the yoke member by means of a cross-pin extending through the yoke member and received in bearings in the ring, and each ring having a pair of opposed trunnions at right angles to the axis of its cross-pin, an intermediate transmission ring between the two universal joints having bearings on opposite sides thereof receiving the trunnions of said transmission rings, and centering means to keep the yoke members centered with relation to one another in all positions, said intermediate transmission ring being hollow and constituting a lubricant reservoir, passages provided between the reservoir and the trunnion bearings for supplying lubricant to the latter, other passages provided in the transmission rings between the trunnion bearings and the cross-pin bearings to supply lubricant to the latter, and still other passages in the cross-pins connecting the cross-pin bearings to permit lubricant passage therebetween.

29. In a universal joint assembly, the combination of a pair of universal joints on a pair of shafts to be mechanically connected, an intermediate transmission member having said joints connected to opposite sides thereof to transmit drive from one shaft to the other, said member being hollow and constituting a lubricant receptacle, and separate lubricant conducting channels from said member to the pivots of the universal joints extending through the aforesaid connections of said joints with said member, and centering means to keep the two shafts centered with respect to one another in all positions, there being other channels connecting said centering means with the intermediate transmission member to conduct lubricant to said means for lubrication thereof.

30. In a universal joint assembly, the combination of a pair of universal joints on a pair of shafts to be mechanically connected, an intermediate transmission member having said joints connected to opposite sides thereof to transmit drive from one shaft to the other, said member being hollow and constituting a lubricant receptacle, and separate lubricant conducting channels from said member to the pivots of the universal joints extending through the aforesaid connections of said joints with said member, centering means to keep the two shafts centered with respect to one another in all positions, there being other channels connecting said centering means with the intermediate transmission member to conduct lubricant to said means for lubrication thereof, and an envelope for said centering means to prevent escape of lubricant therefrom, said envelope being constructed so as to serve as an air vent for the assembly.

31. In a universal joint assembly, a pair of trunnion type universal joints, an intermediate transmission ring having the bearings of one pair of trunnions of each joint fastened to one side thereof, torque-transmitting connections between the transmission ring and said bearings comprising grooves having machined side walls in one of said parts and bosses having machined side walls on the other of said parts fitting in metal-to-metal contact with the side walls of the grooves whereby to relieve the bearing fastenings of the load incident to transmission of torque through the ring from one joint to the other, and end thrust transmiting connections between the transmission ring and the said bearings comprising machined shoulders on the ring and bearings disposed in metal-to-metal contact with one another.

CARL E. SWENSON.